United States Patent [19]

Shirk

[11] 4,415,132
[45] Nov. 15, 1983

[54] AIRCRAFT HAVING VARIABLE INCIDENCE FORWARD-SWEPT WING

[75] Inventor: Michael H. Shirk, Vandalia, Ohio

[73] Assignee: The United States of America as represented by the Secretary of the Air Force, Washington, D.C.

[21] Appl. No.: 324,913

[22] Filed: Nov. 25, 1981

[51] Int. Cl.³ .................................................. B64C 3/38
[52] U.S. Cl. ....................................................... 244/48
[58] Field of Search ...................... 244/45 R, 45 A, 46, 244/47, 48, 49, 87, 89, 123, 117 R

[56] References Cited

U.S. PATENT DOCUMENTS

| | | | |
|---|---|---|---|
| 1,865,744 | 7/1932 | Cornelius | 244/48 |
| 2,981,504 | 4/1961 | Parker | 244/48 |
| 2,985,408 | 5/1961 | Johnson | 244/48 |
| 3,565,369 | 2/1971 | Barton et al. | 244/46 |
| 3,870,253 | 3/1975 | Leidy et al. | 244/48 |

FOREIGN PATENT DOCUMENTS

| | | | |
|---|---|---|---|
| 408493 | 3/1910 | France | 244/48 |
| 15158 | 5/1912 | France | 244/48 |
| 706984 | 2/1951 | United Kingdom | 244/46 |

OTHER PUBLICATIONS

Himat, Rockwell International (brochure) 1977.

*Primary Examiner*—Galen L. Barefoot
*Attorney, Agent, or Firm*—Donald J. Singer; John R. Flanagan

[57] ABSTRACT

An aircraft having a fuselage and a pair of forward-swept wings includes a wing carry through extending transversely through the fuselage joining the wings together to form a unitary wing structure, two hinge assemblies, each located adjacent a different one of the wings for rotatably mounting the wing structure to the fuselage and located forwardly of the wing carry through and on a spanwise axis intersecting the aerodynamic centers of the wings, and two actuators, each located rearwardly of the hinge assemblies and extending between the fuselage and a different one of the wings for selectively rotating the wing structure about the hinge assemblies. The hinge assemblies attach the wing structure to the fuselage such that the axis of rotation of the wing structure is substantially collinear with the axis intersecting the aerodynamic centers of the wings so that relatively little force is required of the actuators to vary the angle of incidence of the wing structure.

6 Claims, 7 Drawing Figures

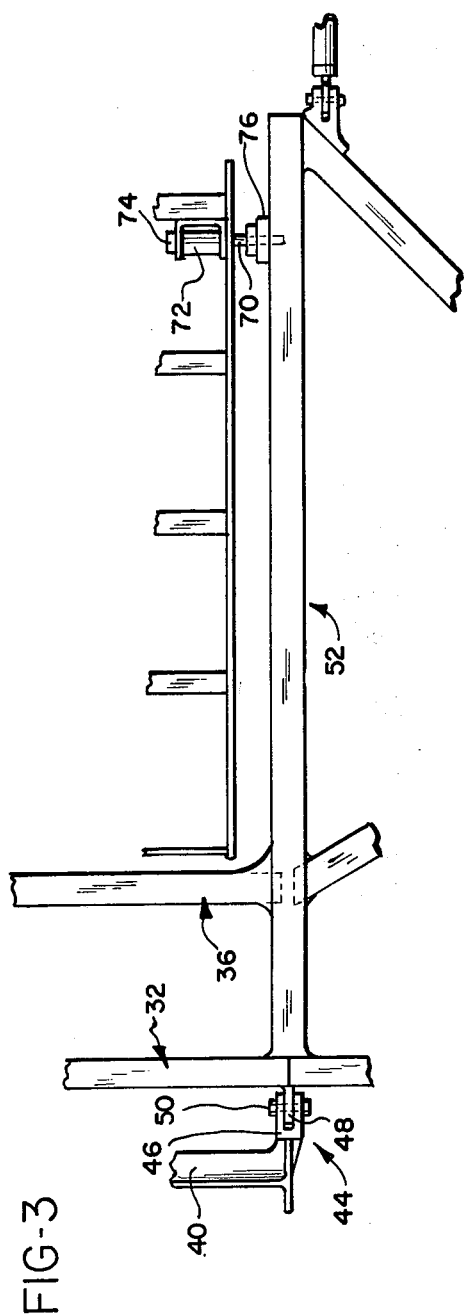
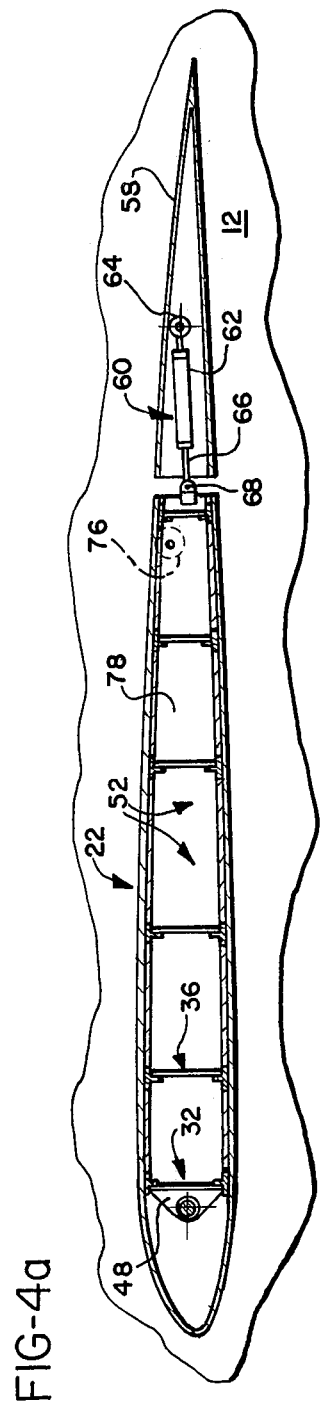
FIG-3
FIG-4a

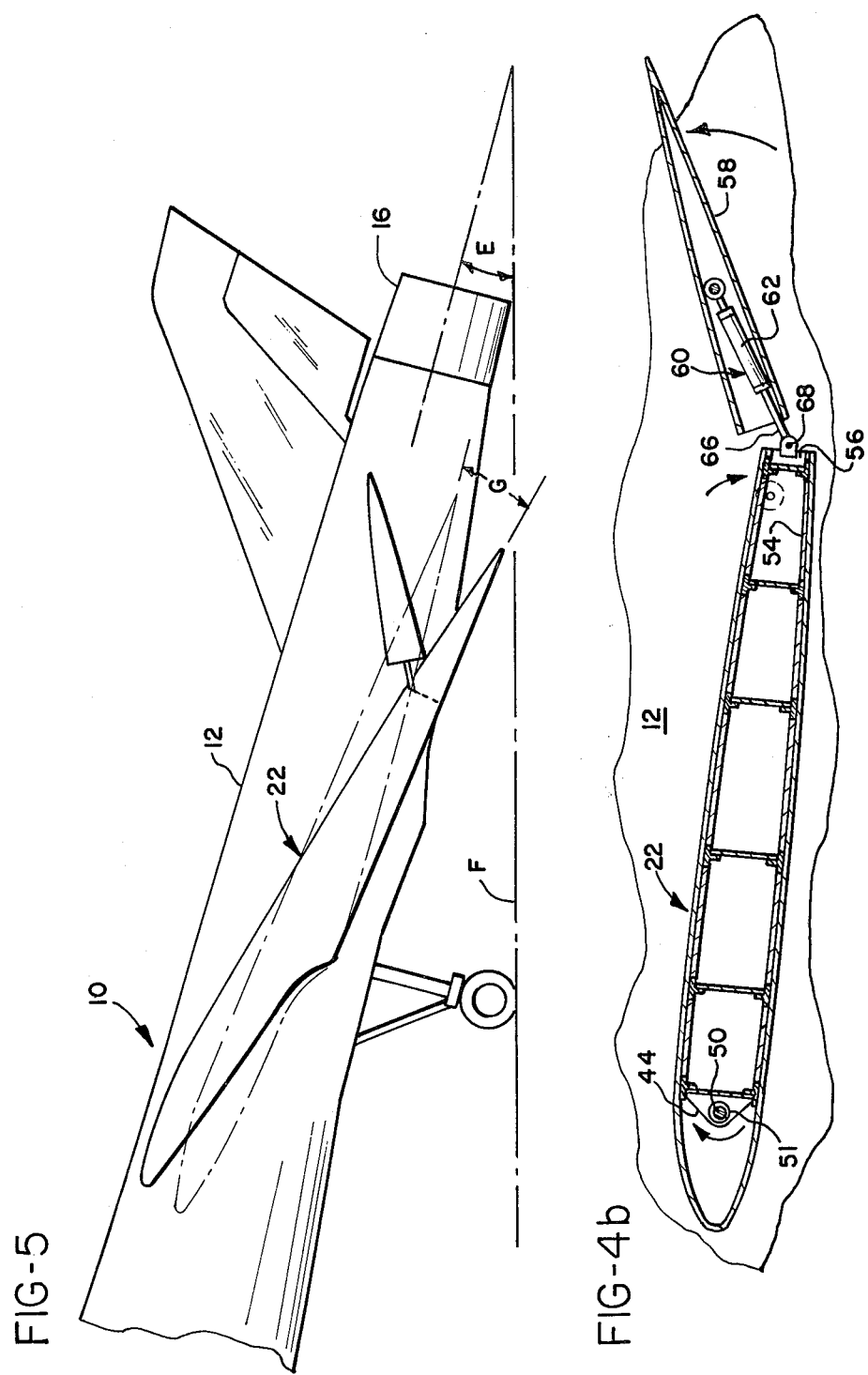

AIRCRAFT HAVING VARIABLE INCIDENCE FORWARD-SWEPT WING

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to aircraft having adjustable wings, and, more particularly, to aircraft having forward-swept wings which are rotatably mounted to the fuselage to allow variation in the angle of incidence of the wings.

2. Prior Art

A forward-swept wing configuration provides desirable flying and control characteristics at low aircraft speeds. Therefore, it is especially desirable to utilize a forward-swept wing configuration with aircraft designed for short take-off and landing (STOL) use. However, a limiting characteristic of this and other types of aircraft is that the achievable angle of incidence or angle of attack at touchdown is somewhat limited. With fixed wing aircraft, the angle of incidence of the wing is controlled by the orientation of the aircraft fuselage. Thus, the maximum angle of incidence of a fixed wing at touchdown cannot exceed its incidence when the fuselage orientation is such that the tail cone scrapes the ground.

This limitation can be overcome through the use of wings made adjustable with respect to the fuselage so that their angle of incidence can be varied. By increasing the wing incidence with respect to the fuselage by the use of an adjustable wing, the angle of incidence of the wings during landing can be increased past the maximum attainable angle of attack for a fixed wing aircraft. For example, if the maximum allowable fuselage incidence at touchdown is approximately 15°, an adjustable wing capable of increasing the incidence of the wing with respect to the fuselage 8°–10° can provide a total angle of attack of approximately 23°–25°, thereby increasing the lift achievable by appoximately 50%. By increasing the achievable lift, a reduced landing speed can be utilized without sacrificing maneuverability or increasing the likelihood of stalling.

A few attempts have been made to provide an aircraft having foward-swept wings which are adjustable to vary the angle of incidence. For example, U.S. Pat. No. 2,406,588 discloses an aircraft having forward-swept wings, each wing being divided into a fixed inner wing panel and an adjustable outer wing panel. The wings are divided along a chord which is intersected at its quarter chord point by a line containing the center of gravity of the airplane and perpendicular to the longitudinal axis of the fuselage. The axes of rotation of the outer wing panels are within a common line, but are not contained within a line common with the line containing the center of pressure of the airplane.

A disadvantage of this type of aircraft lies in the fact that a relatively powerful device must be carried by the aircraft to rotate the outer wing panels and overcome the aerodynamic forces counteracting their rotation. In addition, the connecting members about which the outer wing panels rotate must be sufficiently strong to bear the bending moments imparted on the inner wing panels and fuselage by the aerodynamic forces acting upon the outer wing panels, as well as the vertical shear forces. This requires that sufficient structure be utilized to support the axle within the inner wing panels and fuselage. All of the aforementioned structure adds considerable weight to the aircraft, thereby reducing its maximum payload and other performance characteristics.

Another example of a variable incidence winged aircraft is shown in U.S. Pat. No. 2,293,644. This patent discloses a "pusher-type" aircraft having wings which can be rotated forwardly into a forward-swept configuration. In one embodiment of the disclosure, the wings include wing tips which are secured to the ends of their respective fixed wing portion by an inclined pivot. These pivots are inclined in such a manner that, when the movable tip portions are in their rearward position, the rearward portion of each tip portion is slightly above the forward edge thereof, thus giving the movable tip portions a negative angle of incidence. As the tip portions are moved toward the forward position, so that the wings assume a forward-swept configuration, this negative incidence decreases until the incidence of the tip portion is substantially neutral or slightly positive. Thus, in flight, both tip portions would normally be in the rearward position and, during landing, the tip portions would be rotated to their forward positions.

A disadvantage of this wing construction is that wing tip positioning structure is mounted exteriorly of the wings adjacent a leading edge. The presence of this exterior structure approximate the leading edge of the wing increases the wind resistance and drag associated with the wings and also creates undesirable turbulence in the air flowing over the wings which tends to increase the stall speed of the aircraft. In addition, the disclosed aircraft requires extensive mounting structure to provide a sufficient junction between the wings and the fuselage, and auxiliary equipment is required to facilitate the positioning of the wing tips. This increases the overall weight of the plane, as well as the weight of the wings.

Accordingly, there is a need for an aircraft having a forward-swept wing design which is rotatably mounted to the fuselage to permit a variation in the angle of incidence or angle of attack of the wings and which includes a positioning mechanism that is relatively lightweight and uncomplicated.

SUMMARY OF THE INVENTION

The present invention provides an aircraft having a forward-swept wing configuration in which the entire wing is rotatably attached to the fuselage of the aircraft, thereby maximizing the advantages present with variable incidence wing construction. While the joining together of the wings of the forward-swept wing configuration by a wing carry through to form a unitary wing structure is old per se, its rotatable mounting is novel with the present invention. Further, the unitary wing structure retains its previous advantage in that bending moments caused by the aerodynamic forces acting on each of the wings in a plane normal to the longitudinal axis of the fuselage are reacted against each other, thereby reducing the size and requisite strength of the structure used to mount the wings to the fuselage.

Another advantage of the aircraft of the present invention is that the wings are rotatably attached to the fuselage at a location in which the torques or bending moments exerted by the wings in a plane normal to a spanwise axis are reacted against each other so as to substantially cancel each other out. Thus, the mechanism connecting the wings to the fuselage need only bear vertical shear forces and small movements exerted between the wings and fuselage.

Another advantage of the location of the connecting mechanism is that relatively little force is required to vary the angle of incidence of the wings. Therefore, the mechanism for rotating the wings need not be large, heavy, or require a high power source.

The aircraft of the present invention is of the type having a fuselage and a pair of forward-swept wings and includes a wing carry through structure which extends transversely through the fuselage to join the wings together and thereby form a unitary wing structure; two forward hinges, each located adjacent a different one of the wings, for rotatably mounting the wing structure to the fuselage; and two rearwardly mounted actuators, each extending between the fuselage and a different one of the wings. The hinges preferably are located forwardly of the wing carry through and mount the wing structure to the fuselage such that the wing structure rotates with respect to the fuselage about a spanwise axis which intersects the aerodynamic center of each of the wings.

By utilizing a wing carry through to join the forwardly swept wings to form a unitary wing structure, the bending moments exerted by the wings resulting from the aerodynamic forces acting upon each wing in a plane normal to the longitudinal axis of the fuselage are borne by the wing carry through and are reacted against each other. Since the forward hinges are located on a spanwise axis intersecting the aerodynamic centers of each of the wings, the resultant of all the moments and torques acting upon the hinges in a plane normal to a spanwise axis is very small. Therefore, the load borne by the hinges is substantially limited to the load exerted by the vertical shear forces acting between the hinges and the wing structure. Consequently, there is no need to provide a heavy, high strength connection to withstand large bending moments.

Since the hinges are located on a spanwise axis joining the aerodynamic centers, they bear substantially all of the vertical shear load between the wing structure and fuselage. Thus, the connections joining the actuators to the fuselage need not be large or heavy to transmit the relatively small shear load and aerodynamic movement they carry. In addition, because the load transmitted through the hinges is substantially a shear load with a very low moment, relatively little power is required of the actuators to overcome the moment and rotate the wing structure.

By positioning the actuators rearwardly of the hinges, the mechanical advantage of the actuators is increased, thereby further reducing the force required to rotate the wing structure. Moments to rotate the wing structure in either positive or negative directions can also be generated by control surface deflection. The wing structure can be rotated by releasing the actuators and allowing the control surfaces to generate the desired moments to rotate the wing structure.

In the preferred embodiment, locking mechanisms are also provided to lock the wings in a position of minimal incidence to provide added stability of the wing structure during high speed flight conditions. The locking mechanism can simply be a solenoid, mounted to the fuselage, having a reciprocating pin which can be selectively positioned to engage or disengage a mating hole formed in the adjacent portion of the wing structure.

Accordingly, it is an object of the present invention to provide an aircraft having a forwardly swept wing structure in which the angle of incidence or angle of attack of the wing can be varied to optimize the lift capabilities of the aircraft, especially during landing conditions; to provide a wing positioning apparatus which is simple in construction and of relatively light weight and low cost; and to provide a wing positioning apparatus which is located at those points on the aircraft and wing structure at which the various bending moments exerted by the wing structure react against each other so that the load transmitted to the fuselage is substantially a vertical shear load.

Other objects and advantages of the invention will be apparent from the following description, the accompanying drawing and the appended claims.

BRIEF DESCRIPTION OF THE DRAWINGS

FIG. 3 is a detail view of the skeletal structure of the wing detail shown in FIG. 2;

FIG. 4a is a somewhat schematic, detail side elevation, in section, of the wing structure of the preferred embodiment taken at line 4—4 of FIG. 1, showing the wing in an undeflected position;

FIG. 4b is a view of the wing section of FIG. 4a showing the wing in a deflected position;

FIG. 5 is a partial side elevation of the aircraft of FIG. 1 in which the wing structure is rotated to increase the wing angle of incidence.

DETAILED DESCRIPTION OF THE PREFERRED EMBODIMENTS

Figure 1:
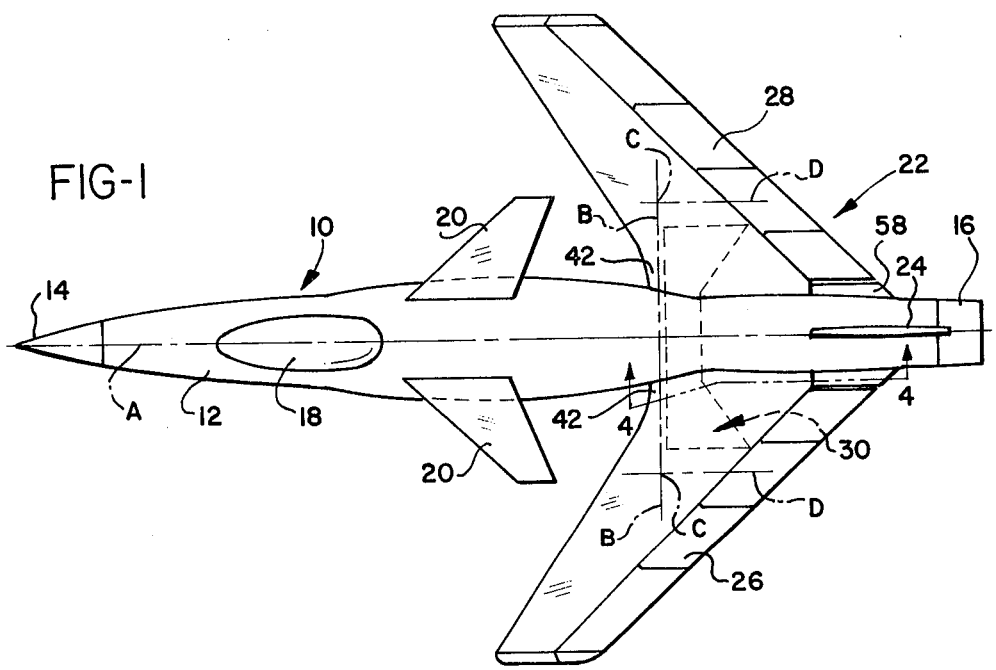
FIG. 1 is a plan view of a preferred embodiment of an aircraft having a forward-swept wing and incorporating the rotatable wing design of the present invention.

As shown in FIG. 1, the aircraft of the preferred embodiment, generally designated 10, includes a fuselage 12 having a nose 14, tail cone 16, and cockpit 18. Attached to the mid portion of the fuselage 12 are canards 20. To the rear of the fuselage is mounted the rotatable unitary wing structure of the invention, generally designated 22. A vertical stabilizer 24 extends from the fuselage 12 in a direction perpendicular to the span of the wing structure 22.

Figure 2:
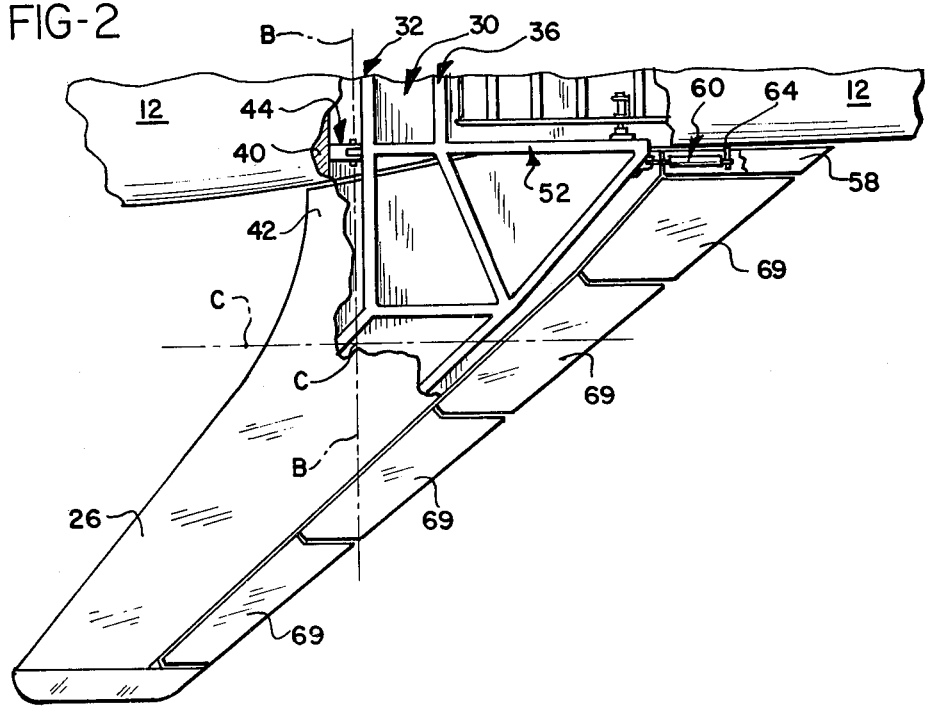
FIG. 2 is a detail plan view of the wing structure and fuselage of the aircraft of FIG. 1, partially broken away to show two of the four points of attachment of the wing structure to the fuselage.

As shown in FIGS. 1, 2, and 4a, the wing structure 22 consists of a pair of forwardly swept wings 26, 28 joined by a wing carry through 30. The wing carry through 30 includes a forward spar 32, and a rear spar 36. The wing carry through 30 extends through a spanwise opening in the fuselage 12 to join wings 26, 28 together. The forward and rear spars 32, 36, which extend spanwise through the opening, extend outwardly from the fuselage 12, to form an integral part of the structure of wings 26, 28. Thus, the wings 26, 28 and carry through 30 act as a unit and may be fabricated as a unit. Bending moments exerted on wings 26, 28 during flight are transmitted to the wing carry through 30 and are reacted against each other to yield a resultant vertical shear force in a direction perpendicular to the spars 32, 36, and to a central longitudinal axis A of the fuselage 12.

As shown in FIGS. 2 and 3, the forward spar 32 is attached to a main frame 40 of the fuselage adjacent the root 42 of wing 26 by a hinge 44. It should be noted that the shape and construction of the wing 28, portion of the wing carry through 30 adjacent wing 28, and the means for attachment of the wing structure 22 to the fuselage 12 on this side of the aircraft 10, are identical to that shown for wing 26 in FIGS. 2, 3, 4a, and 4b, but of reverse hand. Therefore, the discussion of this embodiment shall be limited to wing 26 and the adjacent portion of the fuselage 12, with the understanding that it applies equally to wing 28 and its adjacent portion of the fuselage.

As shown in FIGS. 3 and 4a, the hinge 44 includes a clevis 46, which is attached to the fuselage main frame 40, a gusset 48, attached to forward spar 32, and a bolt 50. Bolt 50 extends through bearings 51 in the clevis 46 and gusset 48 and is oriented such that its longitudinal axis is parallel to the adjacent spar 32.

Extending rearwardly of the hinge 44 is the main root rib 52, shown in FIGS. 2, 3, 4a, and 4b. A flange 56 is located at the trailing edge of rib 52. Positioned rearwardly of the trailing edge of rib 52 is a fairing 58 which houses an actuator such as a double-acting cylinder 60. The body 62 of the cylinder 60 is rotatably mounted to the fuselage 12 by a shaft 64 which also supports the fairing 58 so that both the fairing and the cylinder may rotate about the same shaft axis. The rod 66 of the cylinder 60 is rotatably mounted to the flange 56 by a pin 68.

The hinge 44, and the corresponding hinge located adjacent wing 28 (not shown), are positioned to provide an axis of rotation, designated by line B in FIGS. 1 and 2, for the wing structure 22 which intersects the aerodynamic centers of the wings 26, 28, designated by points C. The aerodynamic centers C are located approximately at the quarter chord point of the mean aerodynamic chords D of the wings 26, 28. Since the hinges 44 are located along the axis B, substantially all of the lifting force exerted by the wing structure 22 is transmitted to the fuselage 12 through them, and the torque exerted on the wing is very small and is reacted by the cylinder 60.

Thus, the wing structure 22 is connected to the fuselage 12 at four points. The hinges 44, which connect the forward portion of the wing structure 22 to the fuselage 12, represent two of the points. The other two points comprise the pins 64 which attach the cylinders 60 to the fuselage 12. Since the hinges 44 bear a substantial portion of the shear load, and torques and bending moments exerted by the wing structure 22 on the fuselage 12 are minimized, the force required by the cylinders 60 to rotate the wing is relatively small. Moments may be generated to assist the cylinders 60 by deflection of trailing edge control surfaces 69. Also, by locating cylinders 60 at a distance from hinges 44, the leverage of the cylinders rotating the wing 22 about the hinges is increased, further reducing the requisite size, weight, and power of the cylinders. In addition, the shafts attaching the cylinders 60 to the fuselage 12 need not be heavy or relatively strong since most of the shear force is carried by the hinges 44. The shafts 64 need only be strong enough to bear the small shear forces existing at the trailing portion of the wings 26, 28, plus the relatively small moments and torques which may exist as a result of the axis B being slightly ahead of or behind the true aerodynamic centers of the wings.

In order to provide increased stability of the wing structure 22 during normal flight conditions, as seen in FIG. 3 a pin 70 may be positioned by a double-acting cylinder 72 mounted to the fuselage 12 by a bracket 74 so as to extend outwardly from the fuselage to engage a boss 76. The boss 76 is formed in a vertical web 78 of the main root rib 52, preferably forwardly of the flange 56. Thus, when the wing structure 22 is positioned as shown in FIG. 4a, the double-acting cylinder 72 may urge the pin 70 outwardly from the fuselage 12 to engage the boss 76, thereby rigidly holding the wing structure in position. Preferably, an identical cylinder and boss arrangement exists between wing 28 and fuselage 12.

The movement of the wing structure 22 is shown in FIGS. 4a and 4b. In FIG. 4a, the wing structure is oriented substantially parallel to a central axis A of the fuselage 12 (shown in FIG. 1). When in this position, the double-acting cylinder 60 has retracted the rod 66 into the body 62. The fairing 58 is substantially aligned with the wings 26, 28 to provide a continuous aerodynamic surface.

When the aircraft 10 has reduced its air speed to the point where it is desirable to increase the angle of incidence of the wing structure 22, such as during landing, the wing structure is deflected as shown in FIG. 4b. To rotate the wing structure 22, the double-acting cylinder 60 is actuated such that the rod 66 is urged outwardly from the body 62 of the cylinder, thereby causing the wing structure 22 to rotate about the bolts 50 of the hinges 44. The pin 68, which connects the rod 66 to the flange 56, is located adjacent the lower portion of rib 52 so that extension of the rod 66 causes the wing structure 22 to rotate in a clockwise direction about the hinges 50 as shown in FIG. 4b. This, in turn, causes the fairing 58 to rotate slightly in a counterclockwise direction.

As shown in FIG. 5, the aircraft 10 of the present invention, when making a landing approach, can orient its fuselage 12 at an angle E of approximately 11° to a horizontal runway surface, represented by line F. At this point, the tail cone 16 and the wheel 80 of landing gear 82 are touching the runway surface. By rotating the wing structure 22 in the manner previously described 8° with respect to the fuselage 12, represented by the angle G, a total effective wing angle of incidence of 19° is achieved.

Figure 6:
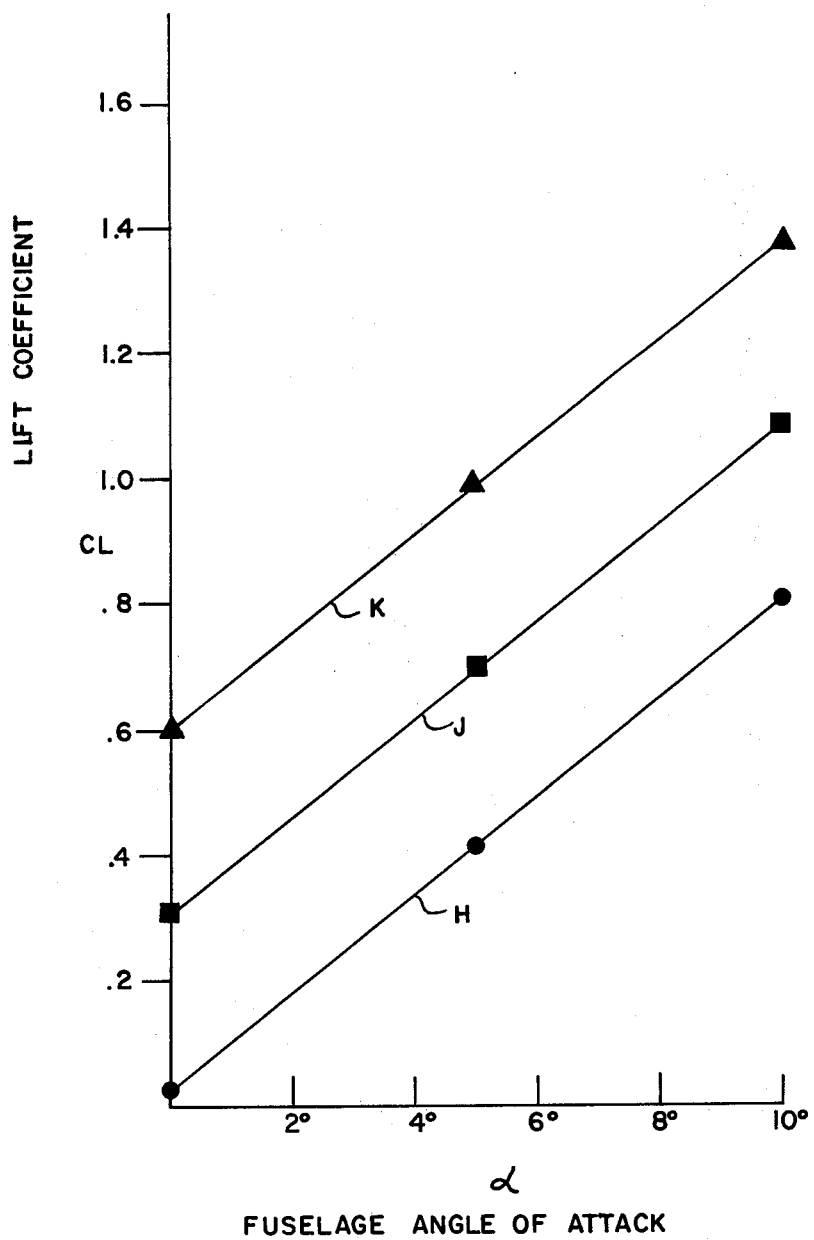
FIG. 6 is a graphic representation of the increase in the lift coefficient of the aircraft of FIG. 1 resulting from an increase in the angle of incidence of the wing structure.

The effect of the change of incidence is shown graphically in FIG. 6. Line H joining the circular points represents the increase in lift coefficient caused by an increase in angle of attack of an aircraft fuselage in which the wings have a 0° angle of incidence with respect to the fuselage. Thus, for a fuselage angle of attack of 8°, the lift coefficient is approximately 0.65. However, should the angle of incidence of the wings with respect to the fuselage be rotated to 5°, the relationship between the angle of attack of the aircraft fuselage and the lift coefficient is represented by line J joining the square points. Thus, for a fuselage angle of attack of 8°, the lift coefficient of the wings is approximately 0.925, a 42% increase in lift coefficient over an aircraft whose wings have a 0° angle of incidence with the fuselage. Should the angle of incidence of the wings with respect to the aircraft fuselage be increased to 10°, the relationship of the fuselage angle of attack to the lift coefficient is represented by line K joining the triangular points. Thus, for a fuselage angle of attack of 8°, the lift coefficient is increased to 1.25, a 92% increase in lift coefficient over the aircraft whose wing angle of incidence is 0°.

The wing structure may be fabricated in an approximate combination of conventional aircraft metal and graphite-epoxy composite materials. The actuating cylinders preferably are electrohydraulic, being activated by electrical signals from the pilot at the pilot station to a servo actuator. However, the actuator may be hydraulic, mechanical, electrical, of a combination of these.

While the form of apparatus herein described constitutes a preferred embodiment of this invention, it is to be understood that the invention is not limited to this precise form of apparatus, and that changes may be made therein without departing from the scope of the invention.

What is claimed is:

1. In an aircraft of the type having a fuselage, a pair of forward-swept wings, and a wing carry through extending transversely through said fuselage and outwardly therefrom to form an integral part of each of said wings thereby joining said wings together so as to form with said wings a unitary wing structure, the improvement comprising:

at least two hinge means, each located forwardly of said wing carry through adjacent a different one of said wings and interconnecting said fuselage and said wing carry through, for rotatably mounting said unitary wing structure via its wing carry through to said fuselage, each of said hinge means also being located on a spanwise axis intersecting aerodynamic centers of each of said wings such that an axis of rotation of said unitary wing structure defined by said hinge means is substantially collinear with said spanwise axis; and means attached to said fuselage rearwardly of said unitary wing structure, and extending between and interconnecting said fuselage and said wing structure, for selectively rotating said wing structure about said axis of rotation to vary the angle of incidence of said wing structure as a unit and therewith said wings with respect to said fuselage but without varying the angle of forward sweep of said wings with respect to said fuselage.

2. The aircraft of claim 1 wherein each of said hinge means comprises clevis means attached to one of said fuselage or said wing carry through of said wing structure, gusset means attached to the other of said fuselage or said wing carry through of said wing structure and engaging said clevis means, and bolt means collinear with said clevis and rotatably joining said clevis means to said gusset means.

3. The aircraft of claim 1 wherein said rotating means is located rearwardly of said hinge means.

4. The aircraft of claim 3 wherein said rotating means comprises a pair of double acting cylinders, each extending between said fuselage and a different one of said wings.

5. The aircraft of claim 1 further comprising locking means for fixedly positioning said wing structure about said axis of rotation with respect to said fuselage.

6. The aircraft of claim 5 wherein said locking means comprises solenoid means mounted to said fuselage having a pair of reciprocable pins, each of said pins being selectively positionable to engage and disengage a different one of said wings.

* * * * *